United States Patent

Pöyhönen

[11] Patent Number: 5,915,219
[45] Date of Patent: Jun. 22, 1999

[54] CELLULAR RADIO NETWORK DIVIDED INTO A PRIMARY NETWORK COVERING A SELECTED OPERATING AREA AND AT LEAST ONE SUBSYSTEM COVERING POSSIBLY OVERLAPPING AREA, WITH POSSIBILITY OF HANDOFF AND REGISTRATION BETWEEN PRIMARY NETWORK AND SUBSYSTEM

[75] Inventor: Petri Pöyhönen, Espoo, Finland

[73] Assignee: Nokia Telecommunications Oy, Espoo, Finland

[21] Appl. No.: 08/630,202

[22] Filed: Apr. 10, 1996

Related U.S. Application Data

[63] Continuation of application No. 08/211,939, Apr. 22, 1994, abandoned.

[30] Foreign Application Priority Data

Sep. 10, 1992 [FI] Finland ................................ 924059

[51] Int. Cl.$^6$ ................................................ H04Q 7/22
[52] U.S. Cl. ................... 455/435; 455/436; 455/525; 455/422
[58] Field of Search ....................... 455/403, 422, 455/410, 411, 426, 432, 435, 448, 449, 456, 552, 555, 436, 452, 525

[56] References Cited

U.S. PATENT DOCUMENTS

| | | |
|---|---|---|
| 5,093,925 | 3/1992 | Chanroo . |
| 5,127,042 | 6/1992 | Gillig et al. ........................ 379/59 |
| 5,170,488 | 12/1992 | Furuya ............................... 379/59 |
| 5,208,847 | 5/1993 | Allen . |
| 5,218,354 | 6/1993 | Hess ................................ 455/54.1 |
| 5,257,400 | 10/1993 | Yoshida ............................ 455/54.2 |
| 5,327,575 | 7/1994 | Menich et al. ...................... 379/60 |
| 5,392,458 | 2/1995 | Sasuta et al. ................... 455/33.1 X |
| 5,438,608 | 8/1995 | Kojima ........................... 379/58 X |

FOREIGN PATENT DOCUMENTS

| | | |
|---|---|---|
| 300721 | 1/1989 | European Pat. Off. . |
| 505105 | 9/1992 | European Pat. Off. . |
| 530161 | 3/1993 | European Pat. Off. . |
| 9112698 | 8/1991 | WIPO . |

OTHER PUBLICATIONS

Mouly et al., *The GSM System for Mobile Communications*, Palaiseau, France, 1992.

*Primary Examiner*—Dwayne D. Bost
*Assistant Examiner*—William G. Trost
*Attorney, Agent, or Firm*—Pillsbury Madison & Sutro LLP

[57] ABSTRACT

A cellular radio system includes cells or cell groups complementing the network capacity locally. These cells or cell groups have not been presented as neighboring cells for the surrounding network. This means that a mobile station of the cellular radio network will not at any stage become aware of these compelementary separate radio coverage islands on the basis of the neighboring cell information received from a base station. The coverage of these separate cells and cell groups may topologically overlap the other cells of the cellular radio network. An access of the mobile station to the cells of a compelementary system is based on its a priori information of at which frequencies such a complementary radio coverage may be found (depending on the location of the mobile station). At least part of the mobile stations have then an automatic or user-operated facility of scanning these frequencies. Moreover, various checking of access rights and various priority systems may be associated with the use of the complementary systems.

13 Claims, 2 Drawing Sheets

CELLULAR RADIO NETWORK DIVIDED INTO A PRIMARY NETWORK COVERING A SELECTED OPERATING AREA AND AT LEAST ONE SUBSYSTEM COVERING POSSIBLY OVERLAPPING AREA, WITH POSSIBILITY OF HANDOFF AND REGISTRATION BETWEEN PRIMARY NETWORK AND SUBSYSTEM

This is a continuation of application Ser. No. 08/211,939, filed on Apr. 22, 1994, which was abandoned.

FIELD OF THE INVENTION

The invention relates to cellular radio systems and especially to a cellular radio network concept, which facilitates the planning of the cellular radio network.

BACKGROUND OF THE INVENTION

Careful frequency planning is required for building up a cellular network based on frequency division multiple access (FDMA or TDMA/FDMA principle). The basic idea in cellular networks is to reuse the same frequencies over and over again in order to make a limited band of frequencies to serve a large number of users. Normally the frequency reuse is implemented so as to obtain the highest possible capacity from a frequency band available. A cellular network is typically planned as a monolithic unity, and therefore, any change in the transceivers of the network (installation of a new transceiver, change of operating frequency) requires a checking of the frequency planning of the entire network.

Except by frequency planning, the radio system of a cellular network is made monolithic by network configuration information. Neighbouring cells are assigned for each cell, and a list of neighbouring cells is transmitted continuously on a broadcasting channel of the cell to the mobile stations. Based on this system information, mobile stations in idle state monitor the field strength of the current cell and the neighbouring cells and select a new cell if the field strength of the current cell becomes too weak. In the same way, mobile stations having an ongoing call via a base station of a serving cell are capable of monitoring the field strength of the assigned neighbouring cells. On the basis of the obtained field strength information it is possible to make handover decisions in the cellular radio network. The neighbouring cells are defined by means of their frequencies. The transmission of the network configuration information on the broadcasting channel of the cell is an essential precondition of an operation of a conventional cellular radio system, making it possible to maintain an uninterrupted connection between the fixed network and the roaming mobile stations.

Planning a radio network is a laborious measure. Due to the costs, the risks caused for the network operation as a whole, the seriousness of changes to be made in an operating network and the rather long time needed for the whole operation, an existing radio network configuration will not be modified without strong arguments. The operation of the network and business activities utilizing the network must be adapted to the reality that an implementation of a radio network cannot be changed without heavy investments. This reduces the possibilities of the operator of reacting quickly to the varying needs of the customers or to the needs of new customers. Such a capability of reacting would be required, often locally, e.g. for implementation of radio solutions complementing the basic services of the network.

SUMMARY OF THE INVENTION

The object of the present invention is to facilitate the planning of a radio network and to make it possible to plan and modify various parts of the network irrespective of each other.

According to one aspect of the invention, a cellular radio system comprising a cellular radio network with mobile radio stations, the cells of the cellular network, which broadcasting information of their neighboring cells, whereby a mobile station monitors the radio coverage of the neighboring cells and performs a reregistration in idle state or forwards measuring data to the cellular radio network for a handover decision during a call, is characterized in that the cellular radio network comprises at least one separate subsystem consisting of at least one cell in such a way that cells belonging to the subsystem are not presented as neighboring cells by cells not belonging to the subsystem, the at least one subsystem utilizes predetermined frequencies, at least part of the mobile stations comprise means for storing in a memory information of the frequencies at which the at least one subsystem may occur and for reading that information from the memory, the mobile station measures, in addition to the neighboring cell frequencies presented in the broadcasting of the cell, the frequencies stored in the memory, and the mobile station treats a cell of the at least one subsystem offering sufficient radio coverage in the same way as it treats the neighboring cell for the reregistration in idle state or for the handover during a call.

A cellular radio system according to the invention comprises cells or cell groups (subsystems), which complement the network capacity locally and which have not been presented as neighboring cells of the surrounding network. This means that a mobile station of the cellular radio system will not at any stage become aware of these islands of complementary separate radio coverage on the basis of the neighboring cell information received from a base station. The coverage of these separate cells and cell groups may overlap topologically the other cells of the cellular radio network. Access of a mobile station to the cells of a complementary system is based on its a priori information of at which frequencies such a complementary radio coverage may be found (depending on the location of the mobile station). At least part of the mobile stations have an extra facility of scanning these frequencies, operated by the user or suitably automated. Moreover, various checkings of access rights and various system priorities may be associated with the use of the complementary subsystems.

If it were necessary—opposite to the invention—to present the complementary systems, a problem would be that, in densely populated areas, where several complementary subsystems may be close to each other, a plurality of new neighboring cells probably had to be assigned for the cells of the basic network. A mobile station would have to measure all neighboring cells, which would lead to the situation that each single neighboring cell would be measured more seldom, which would reduce the amount and the reliability of the information on which a handover and a re-registration are based. In case of a mobile station moving quickly in the network, this could endanger the permanence of a connection. Since most of the mobile stations would not anyway have access to the complementary systems, the solution according to the invention is preferred, i.e. the complementary systems are not presented as neighboring cells for the cells of the primary network.

For instance, the following additional advantages will be achieved by means of the invention:

mobile stations other than those possibly authorized to access a complementary system do not even try to enter a complementary system, resulting in a reduced signalling load of the network, it is easier to establish a complementary radio coverage, there is no need to change the neighboring cell information of the primary network, it is possible to avoid modifications in an operative network.

According to one embodiment of the invention, in a densely populated area, where frequency planning will be demanding, a radio frequency band available for the cellular radio network is divided into subbands in at least part of the service area of the network. The planning and implementation of these subbands may be performed irrespective of each other. As far as only frequency planning is concerned, a mere division of the frequency band ensure the sufficient independence of the separated parts of the network. To further ensure that the cellular radio network according to the invention will work, such a division of a radio frequency band has been taken into account also in another way. One part of the frequency band has been separated for a so-called "primary system" and the rest for one or several "complementary system(s)". The primary system is a network which is characterized by a complete radio coverage in the operating area of the network, while all other possible systems are seen as complements of this primary network. The complementary networks specifically offer only local extra capacity and are supported by the complete coverage given by the primary network.

By means of the complementary systems according to the present invention, office services and local telephone services may be implemented, or one who offers independent services may act as a customer of the network operator, for instance.

To accomplish a wireless office service, a rather high capacity is required, and to achieve that, it is preferable to use customer premises radio cell equipment. It must be possible to make such installations as per office within a short delivery time. It is advantageous to implement customer premises radio coverage by means of a complementary system according to the invention, whereby the primary network radio system outside the premises does not need to be changed due to the installations to be carried out in the premises. The users of the office experience the radio coverage—and the network service—as an unbroken continuum, irrespective of whether they are outside the premises within the area of the primary network or inside the premises within the area of the office system. This does not prevent the fact that office services may be associated with special features, which consider particular user demands relating to the surroundings of the premises, for instance free internal calls in the office.

It may be preferable for the network operator to authorize independent enterprises to offer network services to vertical customer segments. The extent of freedom of business activities of those who offer such services may be considerably increased, by letting them take the responsibility for the radio network investments. A division of a radio frequency band according to the invention gives the one who offers independent services a possibility of constructing a radio network independent of the actual primary network. In a keenly competed mobile telephone market, such a possibility of a licensed network operator sharing the investment load and the business risk is very interesting in some cases.

BRIEF DESCRIPTION OF THE DRAWINGS

The invention will be explained in the following in greater detail by means of illustrative embodiments with reference to the attached drawing, in which.

A DETAILED DESCRIPTION OF THE INVENTION

Figure 1:
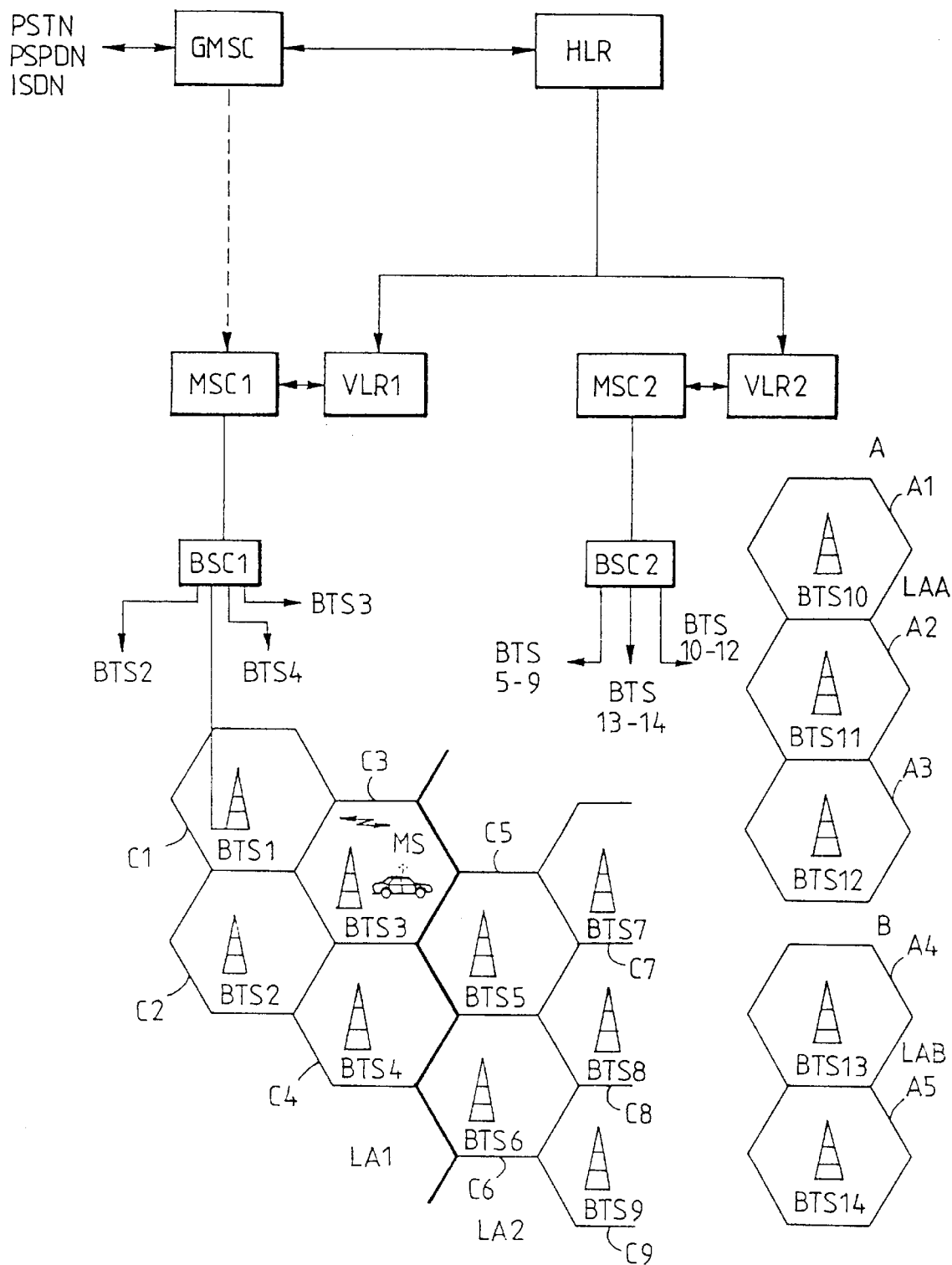
FIG. 1 illustrates schematically one cellular radio system, which is according to the invention divided into a primary network and complementary systems, which are independent of each other.

The invention will be described below in connection with a digital mobile radio system GSM. However, the invention may be applied to most other analog and digital cellular radio systems. The basic structure and basic operation of the GSM mobile radio system are well-known by persons skilled in the art and they are defined in the specification of the GSM system. For a detailed description of the GSM system, a reference is made to a book "The GSM System for Mobile Communications", M. Mouly & M. -B. Pautet, Palaiseau, France. Referring to FIG. 1, some basic concepts and elements of the GSM system facilitating the understanding of the invention are defined in the following. An area in which GSM mobile radio services are available is called a GSM network, which can be connected to other mobile radio networks (e.g. a network of another operator) or to other data communication systems, such as a public switched telephone network.

A GSM network may comprise one or several exchange areas, meaning an area in which services are offered by one mobile telephone exchange MSC. The exchange area may, in turn, be divided into one or several location areas LA, being an area covered by several radio cells C. Cell C means part of the service area of the system within the reach of one transmitting antenna of one base station. The equipment of one base station serves one or several cells. FIG. 1 shows two exchange areas containing mobile telephone exchanges MSC1 and MSC2. Below the exchange area MSC1 there is, e.g., a location area LA1, and in the exchange area MSC2 there is, e.g., a location area LA2. The location area LA1 comprises, e.g., cells C1 to C4 having respective base stations BTS1 to BTS4. The LA2 again comprises, e.g., cells C5 to C9 having respective base stations BTS5 to BTS9. A mobile station MS in cell C establishes a bidirectional radio connection to the base station BTS of the cell in question.

Additionally, a GSM network comprises in general one Home Location Register HLR, which is a database, in which the MS data, such as location data, are stored permanently. The system further comprises one or more Visitors Location Registers VLR for each exchange area. A Visitors Location Register VLR is a database, in which the MS data are stored during the time an MS visits the VLR area. The VLR knows the location of the MS with an accuracy of one location area LA. On the other hand, the HLR knows which VLR the MS is visiting and can thus give the calls terminating in the MS a routing information to the right mobile exchange MSC.

Such a typical cellular network covers the entire geographical area in which the network operator wishes to offer services. The network operator has additionally been granted radio channels in a predetermined frequency range; in Finland, for instance, 902.5 to 907.33 MHz that range is for transmitters of a mobile station MS and 947.5 to 952.3 MHz for transmitters of a base station BTS, which means channels 63 to 86. The number of radio channels is thus rather limited, and therefore, the aim of a cellular network is to reuse the same radio frequencies in cells situated as close to each other as possible and in base stations by means of a so-called reuse pattern. Accordingly, when planning one area of the network, the influence of the implementation, especially that of interference, on at least the immediate neighbourhood of the network shall be considered. In the same way, a local change in the network, e.g. due to added base stations, radio channels or power, influences substantially the operation of the rest of the network, as a consequence of which the planning procedure will be very hard.

According to the invention, a cellular radio network is divided into a primary network, which is characterized in an entirely comprehensive radio coverage in a selected operating area, and into compelementary systems consisting of at least one cell. The complementary systems typically offer only local extra capacity and are supported by the complete radio coverage offered by the primary network.

Such complementary systems may be for instance private systems, such as enterprise or community systems, the radio coverage areas of which cover, e.g., a building site, a building or part thereof, such as one floor.

Figure 2:
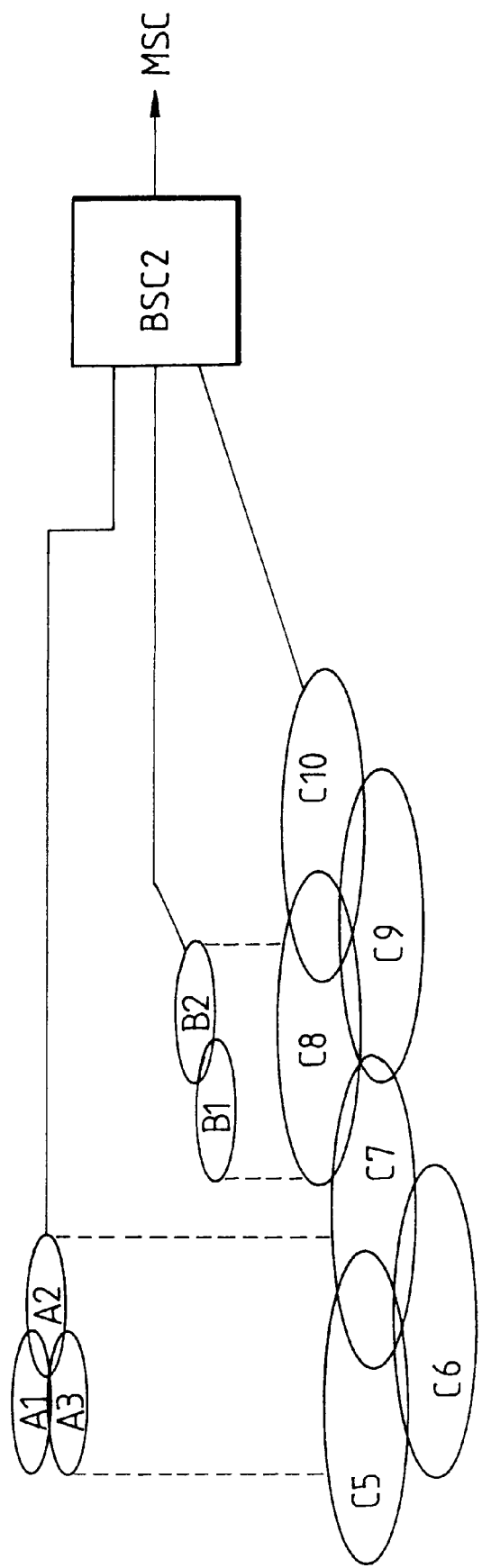
FIG. 2 illustrates a wide coverage of the primary network of FIG. 1 and a local coverage of the complementary systems, typically overlapping the primary network.

In FIG. 1 for instance, the cells C1 to C9 of the location areas LA1 and LA2 with their base stations BTS1 to BTS9 belong to a primary network offering a complete radio coverage in the entire operating area. Further in FIG. 1, two complementary systems have been connected to a Base Station Controller BSC2. One of the complementary systems comprise cells A1, A2 and A3 and respective base stations BTS10 to BTS 12. The other complementary system comprises cells B1 and B2 and base stations BTS13 and BTS14. The radio frequencies utilized by the complementary systems A and B are the same as or different from those utilized by the primary network. As illustrated in FIG. 2, the radio coverage areas of the cells A1 to A3 geographically overlap the cells C5 and C7 of the primary network and the radio coverage area of the cells B1 and B2 of the other complementary system overlaps the cell C8 of the primary network. Both systems, A and B, are configurated to at least one location area and both have at least one unique location area identifier (LAA, LAB). This configuration is utilized in a manner described below to control access authorizations of the radio coverage of the complementary systems. The cells of the primary network and the cells of the complementary systems are independent of each other on radio path level, even if they belong to the same cellular network and share the common mobile exchanges MSC as well as the VLR and HLR registers.

The division of the radio network into a primary network and complementary systems shall be considered also in the operation of the network.

The first question concerns the way that mobile stations MS transit from the primary network into a complementary system. In a conventional cellular network (such as a primary network actually is), the mobile stations MS read from system data transmitted by a base station BTS which neighboring cells C are possible, if the field strength of the current cell becomes weaker. Such a registration to a particular cell defines which cells a mobile station MS may use. Each cell of the network presents locally its own neighbours. In FIG. 1, for instance, the base station BTS3 may define, e.g., C1, C2, C4 and C5 as neighboring cells of the MS, which is registered to this base station (and simultaneously the respective neighboring base stations BTS1, 2, 4, 5). Then the MS monitors, except the signal quality of its own base station, only the quality of the signal sent by the base stations of these neighboring cells and is registered to some of these cells in idle state, if necessary, or performs a handover procedure to some of these cells during a call, if necessary.

From this neighboring cell information may be formed an accessibility graph, which indicates whether a transition between two cells is possible.

In one embodiment of the cellular radio network according to the invention, in order to achieve an independence of radio network planning, the primary network is preferably not provided with any information of complementary systems, and therefore, the cells of the primary network do not present the cells A1 to A3 and B1 to B2 of the systems A and B as their neighboring cells. On account of this, the cells of the primary network and the cells of the complementary systems A and B form separate systems in the sense that the cells A1 to A3 and B1 to B2 of the complementary systems do not belong to the accessibility graph of the cells of the primary network. This means in practice that, e.g., a mobile station MS registered to the cell C3 of the primary network never can be registered through conventional cellular network operation, e.g., to the radio cell A1, A2 or A3 of the complementary system A, even if some of them were geographical neighbours (in the area of the cell C5) and possibly offered the best signal quality. An exception may be a situation in which a mobile station MS is started (switched on), whereby the mobile station according to the known standard operation of cellular networks scans the entire frequency band of its own operator and may (accidentally) discover that the best cell is a cell of the complementary system.

However, since the purpose of the complementary systems A and B is to offer a radio connection, possibly even a primary connection, to at least part of the mobile stations of the network, a procedure of some kind is needed, by means of which a transition from the primary network into a complementary network can be accomplished. In the solution according to the invention, at least one element of subscriber-specific information of those frequencies (radio channels) at (on) which a complementary system to which each respective subscriber has an access may occur is stored in a mobile station MS. This information may be stored in a normal memory of the mobile station MS or in a detachable smart card (e.g. a GSM Subscriber Identity Module, SIM) or in a detachable electronic memory module. A SIM is defined in the GSM recommendation 02.17. In addition to conventional operation, the mobile station MS is supposed to have a capability of reading these radio frequency data from a SIM, for instance. When the mobile station MS has a need to be registered to a complementary system, it scans on the basis of the stored information all frequencies associated with the complementary system. After having found a sufficiently strong base station, the MS starts normal registration procedures to a cell. In this manner, it is possible to implement a reregistration of the MS to a complementary system, even if the primary network cell, from which the MS is coming, does not present the cell of the complementary system as its neighboring cell.

In one embodiment of the invention, a transition to a complementary system occurs manually, for instance by activating a predetermined menu function in the user interface of a mobile station MS. This solution is usable, when the user himself or herself is able to conclude clearly whether a complementary system is available. This is the situation, e.g., in cases in which the radio coverage of a complementary system covers one office. After having arrived at the office, the user knows that the separate radio coverage of the office now can be used. A manual selection starts a reregistration on a frequency band readable from the memory in the manner described above. Then, the mobile station MS may be provided with an indicator, e.g., a LED, which indicates whether the mobile station MS is registered to the primary network or to a complementary system.

Another possibility is to use an automatic system-changeover procedure. In one embodiment of the invention, this is realized by scanning the frequencies of the complementary system periodically. A mobile station MS reads from the scanning data stored in a memory whether some part of the frequency band requires a periodical scanning of frequencies and the timer value by which the MS controls the repeated period of scanning. If the scanning of the frequency band results in an observation of sufficient radio coverage, the mobile station MS starts conventional measures for being reregistered to an observed cell of the complementary system.

It may be necessary to control access rights to complementary systems in a cellular radio system more accurately, as far as separate user groups are concerned. For instance, only the members of such a user group which has participated in the installation costs would be allowed to access the radio installations of particular office premises.

In one embodiment of the invention, this is realized by means of an improved location-updating service of a cellular radio network. Location-updating is a known basic function of a cellular network. An MS starts a location-updating procedure after having registered to such a cell which indicates that it belongs to another location area LA than that cell to which the mobile station MS was registered earlier. Then, the mobile station indicates its new location area to the network.

According to the invention, this known operation is extended in such a way that each such radio coverage area of the complementary systems the access to which shall be controlled for the above outlined reasons is configurated to a separate location area LA or a group of location areas. For each controlled location area LA there are assigned those user groups which have access rights to the radio resources of the respective location areas. A criterion of access rights may thus be also something else than exactly the identity of a subscriber. Subscriber data may contain, for instance, an entry thereof to which user group the subscriber belongs, and the VLR may know with an accuracy of the subscriber groups who has a right to access which location area. Since the location-updating of a mobile station MS is directed to the controlled location area of a complementary system, the cellular network (the VLR in the GSM system) checks the identity of the subscriber or a possible membership of the subscriber in the user group authorized to access, and decides whether an access is allowed or not. If the mobile station MS has no access rights, the cellular network rejects the location-updating (in a manner specific to each network) and the MS is reregistered to the preceding cell or searches for another cell somewhere outside the prohibited location area. In FIG. 1, for instance, some network subscribers may have access rights only to the primary network and the system A, some of them to the primary network and the system B, respectively, etc. Then, e.g., the location updating of the MS of the system B into the cell A3 of the system A would be rejected because of missing access rights, even if the systems A and B had the same frequencies at their disposal.

As an additional embodiment of the invention, it is also possible to realize a handover from the primary network to a complementary system or from a complementary system to the primary network or in both directions during a call, if desired. According to the principles of the invention, a complementary system is not presented in the neighboring cell list of the cells of the primary network.

To perform a handover (and a reregistration) from a complementary network to the primary network, also the cells of the primary network may be presented as a radio configuration of the complementary system, however. This means that a cell of the complementary system presents also the nearest cells of the primary network as its neighboring cells, which makes a handover from the complementary system to the primary network possible through a conventional cellular network operation, for instance in a situation in which a call started in an office cell is continued when the user moves out of the building. In FIG. 1 for example, the cells A1 to A3 of the complementary system A may present, except each other, also, e.g., the cell C5 of the primary network as neighboring cells, in the radio coverage area of which the system A is situated.

To perform a handover from the primary network to a complementary system, a mobile station MS measures also in call state, controlled by the user or automatically with a suitable timing, except the frequencies of the neighboring cell list, also frequencies of the complementary systems A and B according to a list stored in the memory of the mobile station MS. If the complementary system is observed to have radio coverage, also these frequencies are attached to the measuring results reported by the mobile station MS to the cellular network. On the basis of these measuring results, the cellular network can decide whether it is justified to transfer the call to be continued based on the radio coverage of the complementary system. In FIGS. 1 and 2, for instance, an MS in call state, registered to the cell C5 of the primary network, may measure according to a list stored in its memory also the frequencies of the cells A1 to A3 of the complementary system for performing a handover.

The above-described handover to a complementary system during a call requires a different processing for checking the access rights, because no location-updating takes place in the known operation of cellular radio systems during a call, but only after the termination of the call, if the mobile station MS has moved to a new location area in consequence of the handover. However, to make a decision about handover, it shall be possible to check in the cellular radio system according to the invention whether the mobile station or its user has access rights to the available coverage of the complementary system.

One embodiment of the invention utilizes here a cell/base station identifier sent by the cells measured, which identifier is normally used locally by the mobile station MS to ensure that the measuring result obtained actually corresponds to the correct neighboring cell and is not due to an occasional field strength of another cell. In use of the invention, the mobile station MS reports to the cellular network, except the measuring results obtained at each frequency, also the cell identifier received at this frequency. If some complementary system offers a sufficiently good signal on the basis of the measuring results, the cellular network knows by the aid of the cell identifier which complementary system the measuring results concern and may thus check whether this MS or user has access rights to the complementary system and make a decision about handover accordingly.

In a further embodiment of the invention, the priorities of access to the primary network and the complementary systems are arranged on user-specific basis and the order of priority has been stored in the memory of a mobile station MS. Controlled by this priority system, the MS does not take any measures deviating from the conventional operation of the cellular system as long as it finds itself in a system with the highest priority of access (mobility support in a conventional manner: handovers, reregistration controlled by neighboring cell information, location updating on the basis of location area). If the MS finds itself somewhere else than in the system with the highest priority of access and it has a possibility of moving automatically to systems with a higher priority of access (complementary systems), the MS tries to find such a prioritized system. In FIG. 1 for instance, the complementary system A may have a higher priority for some mobile stations MS than the primary network has.

In one embodiment of the invention, a frequency band assigned for the network operator, e.g. part of the channels (124 channels) of a 900 MHz GSM band or part of the channels (374 channels) of a 1,8 GHz DCS1800 band, is divided into parts, the frequency planning of which may occur irrespective of each other. One possibility is to divide the frequency band into two parts, one for the complementary systems and the other for the primary network. Complementary systems can then be realized, especially in an area requiring high capacity and demanding frequency planning, without the systems influencing the frequency planning of the primary network. Without restricting the generality of the invention, an assignment of a group of successive radio channels for the complementary systems may be presented as one such plan for using frequencies. If the channels 1 to 62 have been assigned for the operator, the complementary systems could use the channels 55 to 62 and the primary network the remaining channels.

As known, interference on a neighboring channel prevents users from using adjacent channels in the immediate vicinity of each other (at the same base station in different sectors, for instance). In indoor installations, e.g. in a wireless system of an office, mobile stations may come unexpectedly, due to their irregular propagation indoors, into the area of good field strength of another base station. This may be the case for instance when base stations have been located floor by floor in different parts of the building. Normally, the best signal a mobile station receives is the signal of the base station of its own floor, but, e.g., because of openings in the intermediate floor of the building and other irregularities, the mobile station may in some places unexpectedly receive the signal of the base station of another floor well. If such a base station situated at a close distance utilizes the neighboring frequency, the interference on the neighboring channel increases considerably and prevents the operation of the system. When applying the frequency division according to the invention, it may be necessary in some applications to locate the channels of the complementary system in such a way that their frequencies are at a distance of at least two channels from each other, instead of having a group of successive channels. For the complementary systems could then be reserved channels 10, 20, 30, 40, 50 and 60, for instance.

The main object of the invention is to make it possible to implement subsystems without necessity of coordinating them with the technical realization, e.g. frequency planning, of the primary network. If it is desirable to locate base stations of a separate subsystem without any restrictions, a situation may arise in which a cell of a complementary system intended for an indoor application comes topologically close to a primary network cell operating on a neighboring channel. The primary network and the complementary system may then be connected in an undesired manner through inter-channel interference. To prevent this, a decentralized frequency raster of the complementary systems can be further improved by eliminating from the frequency plan of the primary network (in the high-density service area in question) the neighboring frequencies of the channels reserved for the complementary systems. Accordingly, the channels 9, 11, 29, 31, 39, 41, 49, 51, 59 and 60 would not be used in the primary network of the preceding example.

Alternatively or by complementing the preceding embodiments, radio interferences in the complementary systems and the primary network may be effectively attenuated by means of a suitable frequency hopping. Frequency hopping distributes local accumulations of interference occurring in frequency, time and topological dimension for all users.

By inventive means described above, a sufficient radio isolation of the separate complementary systems and the primary network may be achieved in such a way that both can be planned and implemented irrespective of each other. The presented solutions work especially well in such an application in which the separate subsystems are realized indoors with low radio power, whereby the penetration attenuation of the building walls contributes to providing the radio isolation of the subsystems. Such an application is, for instance, a wireless office data communication. Since the subsystems utilize the same frequency band, radio interferences from one subsystem to another shall be eliminated by suitable planning.

The attached figures and the specification associated with them are only intended to illustrate the present invention. As far as details are concerned, the cellular radio network may vary within the scope and spirit of the attached claims.

I claim:

1. A cellular radio system comprising:

a primary cellular radio network having a plurality of cells including a serving cell broadcasting information as to which ones of said cells are their respective neighboring cells;

a plurality of mobile cellular radio stations located in geographical areas corresponding to locations of said cells and which are each capable of monitoring radio coverage of respective neighboring ones of said cells and according to said neighboring cell information broadcast by a serving cell for at least one of reregistration and handover decisions;

at least one separate cellular subsystem comprising at least one cell configured in such a way that each cell belonging to said subsystem is not presented in said neighboring cell information as broadcast by cells of said primary cellular radio network not belonging to said subsystem;

said at least one subsystem utilizing control channel frequencies which are different from those of said primary cellular network;

select ones of said mobile stations comprising means for storing in a memory, information as to control channel frequencies of said at least one subsystem, and for reading that information from said memory;

only said select ones of said mobile stations being arranged to monitor, in addition to control channel frequencies of respective neighboring cells presented in said broadcast by said serving cell, said control channel frequencies of said at least one subsystem according to said information stored in said memory; and only said select ones of said mobile stations being arranged to consider a cell of said at least one subsystem offering sufficient radio coverage as being a target cell potentially effectively equivalent to the respective said neighboring cells in the primary cellular network in at least one of reregistration and handover decisions.

2. The system according to claim 1, wherein:

said at least one mobile station comprises means for activating said monitoring of said control channel frequencies utilized by said at least one subsystem, and for terminating said monitoring if no signal is observed at said control channel frequencies.

3. The system according to claim 2, wherein:

said means for activating said monitoring is a user-activated means.

4. The system according to claim 2, wherein:

said means for activating is an automatically activated means which is activated at predetermined intervals.

5. The system according to claim 1, wherein:

a list of said control channel frequencies of said at least one subsystem is stored in each said mobile station.

6. The system according to claim 5, wherein:

each said mobile station includes a subscriber-specific replaceable memory means, and said list is stored therein.

7. The system according to claim 6, wherein:

said replaceable memory means is a smart card.

8. The system according to claim 6, wherein:

said replaceable memory means is an electronic memory module.

9. The system according to claim 1, wherein:

there are at least two of said subsystems, each of which is configured to consist of at least one separate location area, each of which does not contain any cell belonging to any other said subsystem and each of which does not contain any cell which does not belong to the respective said subsystem;

means for authorizing and thereby enabling each subscriber of said cellular radio system to access a preselected combination of cells of said primary cellular network and cells of said at least one subsystem;

said means for authorizing including means for maintaining access authorization information for each said mobile station or subscriber; and said means for authorizing further including said cellular radio system being arranged to check said access authorization maintaining means, in connection with each location-updating request in the respective said location area, from a respective mobile station or subscriber, requesting updating on the respective said subsystem, for preventing location-updating of an unauthorized mobile station or subscriber.

10. The system according to claim 9, wherein:

said means for maintaining access authorization stores information as to which of said subscribers are members of a given one of at least one user group, and information as to which user groups have rights to access each said subsystem.

11. The system according to claim 1, wherein:

the cells belonging to each said subsystem means broadcasting neighboring cell information, presenting cells not belonging to the respective said subsystem, for making possible at least one of reregistration and handover from the respective subsystem, to cells not belonging to the respective said subsystem.

12. The system according to claim 1, further including:

means providing a higher priority in reregistration decision to cells belonging to a said subsystem, than to cells not belonging to a said subsystem.

13. The system according to claim 1, further including:

means providing a higher priority in handover decision to cells belonging to a said subsystem, than to cells not belonging to a said subsystem.

* * * * *